US012666325B2

(12) United States Patent
Arngren et al.

(10) Patent No.: US 12,666,325 B2
(45) Date of Patent: Jun. 23, 2026

(54) MANAGING HANDOVER EXECUTION

(71) Applicant: Telefonaktiebolaget LM Ericsson (publ), Stockholm (SE)

(72) Inventors: Tommy Arngren, Södra Sunderbyn (SE); Peter Ökvist, Luleå (SE); David Lindero, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 314 days.

(21) Appl. No.: 18/274,256

(22) PCT Filed: Jan. 27, 2021

(86) PCT No.: PCT/SE2021/050052
§ 371 (c)(1),
(2) Date: Jul. 26, 2023

(87) PCT Pub. No.: WO2022/164358
PCT Pub. Date: Aug. 4, 2022

(65) Prior Publication Data
US 2024/0107395 A1      Mar. 28, 2024

(51) Int. Cl.
*H04W 36/30* (2009.01)
*H04W 36/00* (2009.01)
*H04W 36/38* (2009.01)

(52) U.S. Cl.
CPC .............. *H04W 36/008357* (2023.05); *H04W 36/0058* (2018.08); *H04W 36/00835* (2018.08); *H04W 36/30* (2013.01); *H04W 36/38* (2013.01)

(58) Field of Classification Search
CPC ... H04W 36/008357; H04W 36/00835; H04W 36/0058; H04W 36/30; H04W 36/38
(Continued)

(56) References Cited

U.S. PATENT DOCUMENTS

2012/0176892 A1    7/2012   Yamamoto et al.
2019/0174369 A1*   6/2019   Tomikawa ............ H04W 36/12
(Continued)

FOREIGN PATENT DOCUMENTS

EP        2 468 028 A1    6/2012
WO     2012/112087 A1    8/2012
(Continued)

OTHER PUBLICATIONS

International Search Report and Written Opinion issued in International Application No. PCT/SP2021/050052 dated Oct. 22, 2021 (9 pages).
(Continued)

*Primary Examiner* — Ayman A Abaza
(74) *Attorney, Agent, or Firm* — Rothwell, Figg, Ernst & Manbeck, P.C.

(57) ABSTRACT

A method performed by a base station serving a source cell for managing handover execution. The method includes storing first NCR information for a first target cell, wherein the first NCR information comprises: i) a first cell identifier for identifying the first target cell and ii) processing unit (PU) information indicating whether or not the target cell has at least one PU available. The method further includes evaluating whether or not to initiate a handover of a user equipment from the source cell to the target cell, wherein the evaluation is based at least in part on the PU information for the target cell.

17 Claims, 4 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2020/0092774 A1* | 3/2020 | Sharma | H04W 36/00835 |
| 2020/0221521 A1 | 7/2020 | Cui et al. | |
| 2020/0296643 A1 | 9/2020 | Mukherjee et al. | |
| 2020/0396658 A1* | 12/2020 | Szilagyi | H04W 36/0058 |
| 2021/0136137 A1* | 5/2021 | Munoz | H04L 51/224 |

FOREIGN PATENT DOCUMENTS

| | | | |
|---|---|---|---|
| WO | 2018/127290 A1 | 7/2018 | |
| WO | 2020/229445 A1 | 11/2020 | |

OTHER PUBLICATIONS

Wikipedia, "Asynchronous reprojection", Oct. 16, 2020, https://en.wikipedia.org/w/index.php?title=Asynchronous_reprojection&oldid=983862907 (2 pages).
3GPP TS 36.300 V16.3.0 (Sep. 2020), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Sep. 2020 (390 pages).

* cited by examiner

100

300

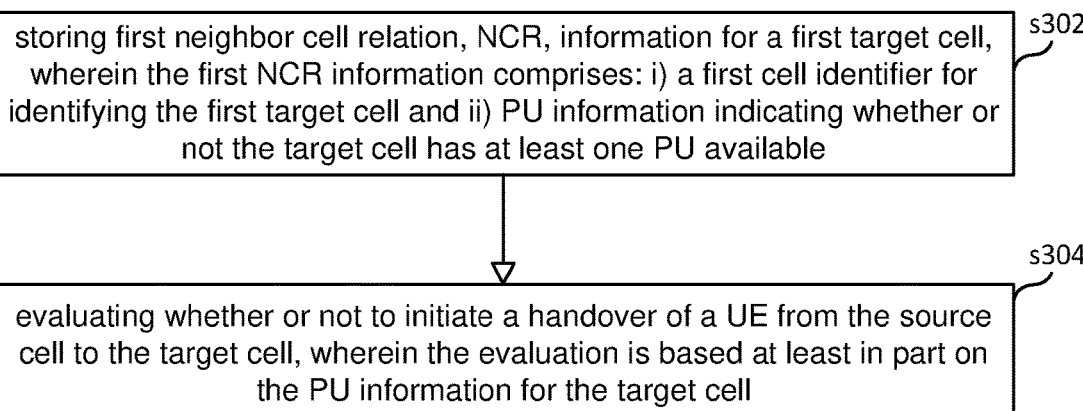

s302 storing first neighbor cell relation, NCR, information for a first target cell, wherein the first NCR information comprises: i) a first cell identifier for identifying the first target cell and ii) PU information indicating whether or not the target cell has at least one PU available s304 evaluating whether or not to initiate a handover of a UE from the source cell to the target cell, wherein the evaluation is based at least in part on the PU information for the target cell

FIG. 3

MANAGING HANDOVER EXECUTION

CROSS REFERENCE TO RELATED APPLICATIONS

This application is a 35 U.S.C. § 371 National Stage of International Patent Application No. PCT/SE2021/050052, filed 2021 Jan. 27.

TECHNICAL FIELD

This disclosure relates to methods, devices, computer programs and carriers related to managing handover execution.

BACKGROUND

Graphic Processing Units (GPUs) and Cloud Gaming

The GPU has become an important type of computing technology, both for personal and business computing. GPUs are used in a wide range of applications, including graphics and video rendering. For example, GPUs are becoming popular for use in gaming (e.g., cloud gaming), remote rendering, extended reality (XR) (e.g., virtual reality (VR), augmented reality (AR), etc.), and artificial intelligence (AI).

Cloud gaming and remote rendering involve employing a GPU (or a group of GPUs) that is remote from the user's user equipment (UE) to render high-fidelity images (e.g., video frames) of a game. The images are then transmitted from the GPU to the user's UE, which then displays the images to the user. The UE may also receive input from the user and transmit this user input to the GPU. An advantage of cloud gaming is that the GPUs that are "in the cloud" typically have much more rendering power than the user's UE (e.g. mobile phone, computer, XR device, tablet, etc.).

In some instances, the remote GPUs are owned by the company that sells the game or by an online gaming service provider (e.g., Google LLC, which provides an on-line gaming service known as Stadia). Accordingly, the remote GPUs are located outside of the user's premises (e.g., home or office) and sometimes not even in the same city or country as the user. In other instances, the remote GPU may be owned by the user. For example, a home streaming solution known as Steam allows a user to construct a system where a games is rendered on one of the user's devices, but the user plays the game on another one of the user's devices. Essentially, one of the user's device is a remote GPU that is accessible by UEs with the same user login on the same or different network.

It is expected that computers with competent GPUs will become ubiquitous. Gaming consoles in every living room, the workstation at the office, and even high-end tablets have a medium range GPU nowadays. Even cars, surveillance cameras and other non-computer devices are getting equipped with GPUs or TPUs for performing machine learning inferencing efficiently. There will likely be hundreds of available rendering devices in each parking lot in the future, being able to supply both storage and compute power for a multitude of thin UEs used by people in the vicinity (e.g., at sporting events).

Cloud Architecture

In a typical XR application, GPU processing units may be in an edge-cloud environment where one or more GPUs may be located at a base station or in some logical topology associated with a base station. Also, it is expected that a cellular connected XR user device may be located in a location where the XR user device could be served by more than one base station. Accordingly, handover between these base stations is also expected. Hence, depending on network topology, user mobility that causes handover between different base stations may also imply that different edge cloud processing nodes (e.g. in terms of provided delay, frame renderings, etc.) will become accessible for the XR user device.

Automatic Neighbor Relation (ANR) Function

The purpose of the ANR function is to relieve the operator from the burden of manually managing Neighbor Cell Relations (NCRs). The ANR function resides in a base station (e.g., an eNB or a gNB) and manages the Neighbor Cell Relation Table (NCRT). The ANR function includes a Neighbor Detection Function (NDF) that functions to identify new neighbors of the base station and add these new neighbors to the NCRT. The ANR function also includes a Neighbor Removal Function (NRF) which removes outdated NRs.

Typically, when a UE has detected a new cell not previously known, the serving cell's relation to said new cell is updated (controlled) by an Operation & Maintenance (O&M) server, typically with entries according to no remove (i.e., eNB must not remove this cell from the NCRT), no handover (i.e., no handover shall be initiated into this cell), or no X2 (excludes the establishment of the logical X2 interface to this identified cell and its serving eNB).

Hence, in the process of determining if/how entries in the NCRT should be considered are taken with respect to classical radio network deployment characteristics such as distance to "the new cell," signal strength, input available from radio planning/area topology, etc. to optimize cellular network performance.

The ANR function is further described in 3GPP Technical Specification (TS) 36.300 V16.3.0 at clause 22.3.2a.

SUMMARY

An object of this disclosure is to enable reduced latency.

Certain challenges presently exist. For instance, XR services using remote rendering (i.e., rendering of video elements by a device that is remote from the XR user device that functions to display the video elements to a user) are delay sensitive. In a scenario with cellular mobility for the XR user device, handover between connections points (e.g., cells) will likely occur, and whatever service the XR user device runs, the services must re-negotiate settings, update buffers, and setup a new data stream, etc. This service re-establishments may cause latency spikes and potentially also degradation in the XR services. Typically, in legacy cellular networks, in the negotiation procedure following a handover between the serving base station (BS) (a.k.a., source base station) and target BS, the target BS is responding to the handover notification with an ACK/NACK if the target BS determines whether it can support the UE being handed over. In today's solution, the target BS determines whether it can support the incoming UE by only looking at certain internal processing resources and/or air interface resources. That is, the target BS does not consider other resources, such as, for example, processing resources for producing application layer data for the UE (e.g., processing resources for rendering video elements for an XR user device).

This disclosure aims to improve the handover procedure. Accordingly, in one aspect there is provided a method, performed by a base station, for managing handover execution. The method includes storing first neighbor cell relation (NCR) information for a first target cell, wherein the first NCR information comprises: i) a first cell identifier for identifying the first target cell and ii) processing unit (PU) information indicating whether or not the target cell has at least one PU available. The method further includes evaluating whether or not to initiate a handover of a user equipment (UE) from the source cell to the target cell, wherein the evaluation is based at least in part on the PU information for the target cell.

In another aspect there is provided a computer program comprising instructions which when executed by processing circuitry of a base station causes the base station to perform the method. In another aspect there is provided a carrier containing the computer program, wherein the carrier is one of an electronic signal, an optical signal, a radio signal, and a computer readable storage medium.

In another aspect there is provided a base station, where the base station is adapted to perform the method of any embodiments disclosed herein. In some embodiments, the base station includes processing circuitry; and a memory containing instructions executable by the processing circuitry, whereby the base station is operative to perform the methods disclosed herein.

An advantage of the embodiments disclosed herein is that the target base station can consider additional resources when determining whether the target base station is capable of serving the incoming UE and this can lead to that latency can be reduced, which will lead to higher Quality of Experience for the user as well as potentially increasing the battery life of the user's UE.

BRIEF DESCRIPTION OF THE DRAWINGS

The accompanying drawings, which are incorporated herein and form part of the specification, illustrate various embodiments.

FIG. 3 is a flowchart illustrating a process according to an embodiment.

DETAILED DESCRIPTION

Figure 1:
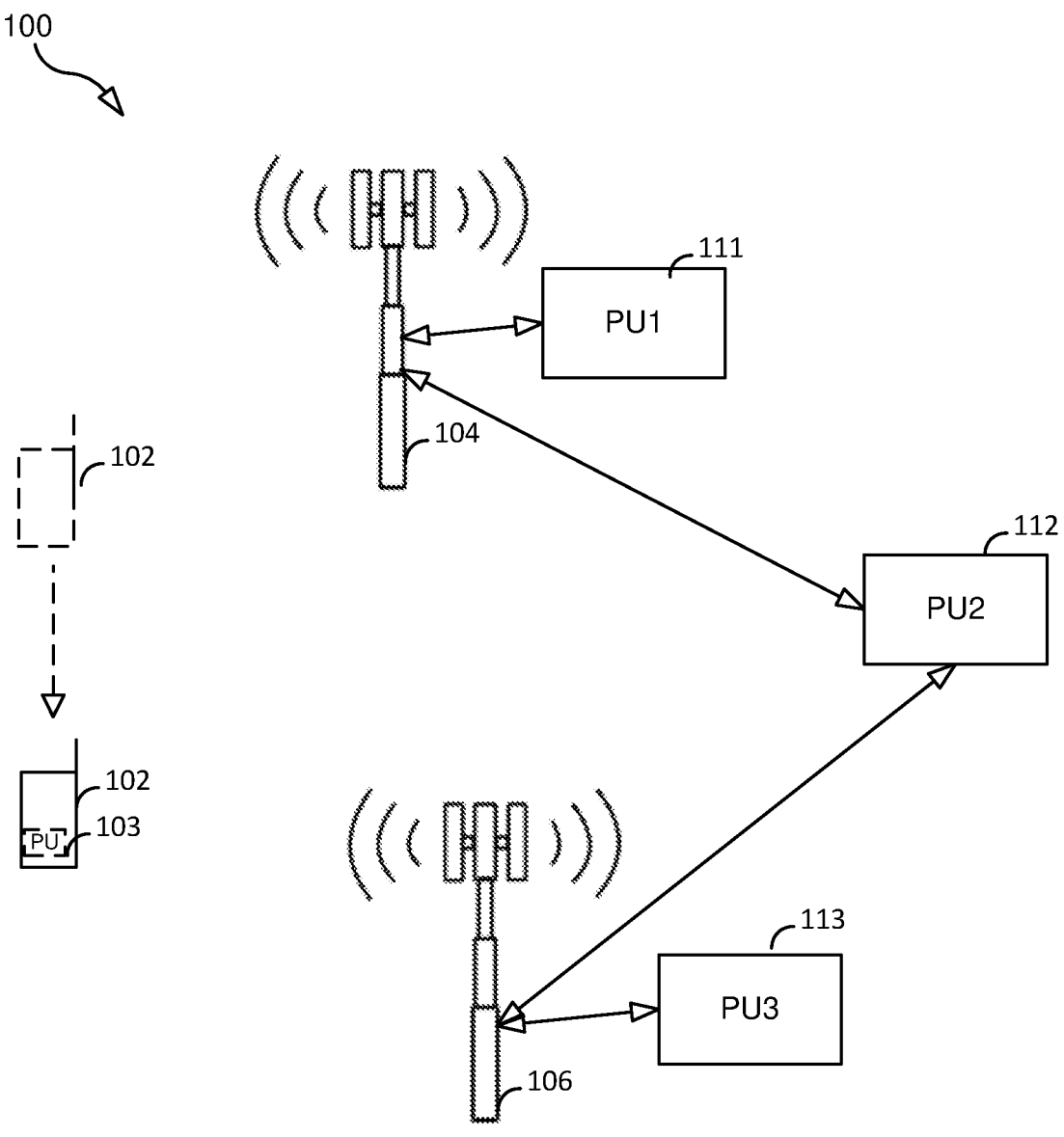
FIG. 1 illustrates a communication system according to an embodiment.

FIG. 1 illustrates a communication system 100 according to an embodiment. In the example shown, communication system communicates with a UE 102 and includes a set of base stations (base station 104 and base station 106), and a set of "remote" PUs (PU 111, PU 112, PU 113) (the PUs are "remote" from the UE's perspective). A person of skill in the art would recognize that FIG. 1 is illustrative only and that communication system 100 may communicate with any number of UEs and include any number of base stations, PUs, and PU selection functions. As used herein, a user equipment (UE) is any device capable of communicating with a remote PU directly or indirectly via an access network. Examples of a UE include: a smartphone, a home computer, a head-mounted display (HIVID), a gaming console, a streaming device, a tablet, an appliance, a sensor, a vehicle, a gateway, a router, etc.). In the example illustrated, UE 102 is mobile and can move from the coverage area of base station 104 to the coverage area of base station 106 (these coverage areas may partially or fully overlap). Further, as used herein a "base station" is any access point that provides network connectivity to a UE. Such access points include, but are not limited to: 3GPP LTE base stations (usually denoted "eNB"); 3GPP NR base stations (usually denoted "gNB"); and non-3GPP base stations (e.g., wireless local area network (WLAN) access points). Future access points, like base stations for a future $6^{th}$ generation (6G) wireless communication network, are also envisioned as applicable.

For expositional purposes, assume that UE 102 is running a gaming application that is operable to be served by a remote PU. For example, the gaming application is operable to 1) provide to the remote PU user input information (UII) specifying one or more actions the user of the UE has performed and 2) receive video frames rendered by the remote PU, which video frames may be rendered based on the UII. As illustrated in FIG. 1, the gaming application can be served by any one or more of remote PU 111, remote PU 112, or remote PU 113. Additionally, UE 102 may contain a local PU 103 that can serve the gaming application (e.g., the local PU can perform all the video rendering).

Figure 2:
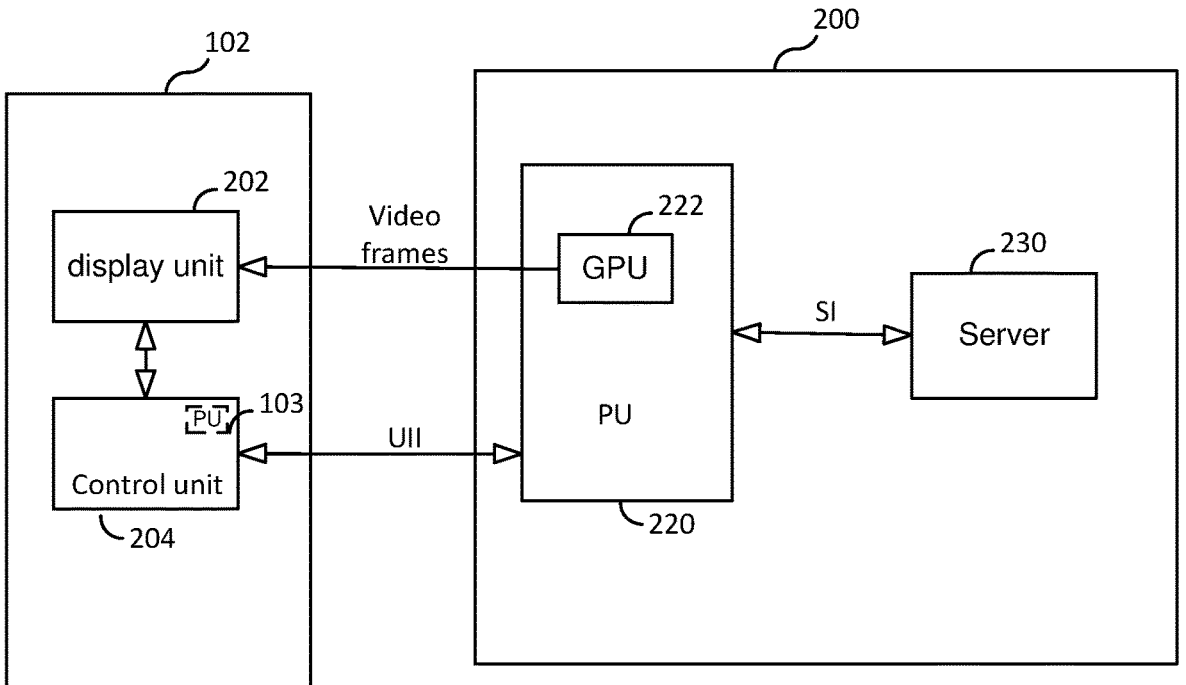
FIG. 2 illustrates a gaming system according to an embodiment.

FIG. 2 illustrates UE 102 communicating with a system 200 (e.g., a gaming system, an XR system, etc.). In the example shown, UE 102 includes a display unit 202 and a control unit 204. System 200 includes server 230 and a PU 220 that comprises a GPU 222. Any one of remote PUs 111, 112, 113 may implement PU 220. GPU 222 functions to render video frames, which are then transmitted to UE 102 and processed by display unit 202 (e.g., display unit 202 receives the video frames and displays corresponding images on a display device of the UE). Control unit 204 functions to detect user actions (e.g., movements of the user or the user activating a control) and to provide to PU 220 user input information (UII) specifying one or more actions the user of the UE has performed. This user input information may be used by GPU 222 to render the video frames and it may be forwarded to server 230. Additionally, server 230 may forward to PU 220 state information (SI) (which may include UII related to other users), and GPU 222 may also use this state information to render the video frames. As FIG. 2 illustrates, information that is needed to render the video frames can be provided to the PU 220. Accordingly, the rendering can be moved completely to the PU 220 (which may be in or near a base station), thereby allowing the UE 102 to be used only for controls and as the display.

As noted above, certain challenges presently exist. For instance, services using remote rendering are delay sensitive and in a scenario where UE 102 is mobile, handover between connections points (e.g., cells) will likely occur. In the mobility procedure, whether or not UE 102 will be moved to one cell or another cell depends on how respective source-target cell relations are defined in the NCRT of the serving base station (i.e., the base station currently serving the UE). For example, if a certain cell is not a preferred one, Handover (HO) or X2 communications may be barred accordingly. In an edge cloud deployment, not only should core metrics, Radio Access Network (RAN) metrics, and transport node metrics be considered for the capacity check, but also any other typical resource that UE 102 may have. As other application critical measures may be associated with, for example, edge cloud connected XR glasses (such as transmission delay and jitter), it is useful that also other non-access related resource metrics should be considered in a decision process related to mobility. For example, depending on edge cloud and access network topologies, relevant and/or accessible XR processing resources may be associated with different base stations.

Accordingly, this disclosure describes extending the conventional NCRT. As illustrated herein, the extended NRCT, in one embodiment, indicates whether a neighbor cell has any PU (e.g., GPU) resources available. In other embodiments, the extended NCRT may also comprises information further describing measures associated with PU processing frame rate, data transfer delays, or similar. Another PU-related NRT entry may consider if said processing is available on-node, or if not within how many steps (with associated delays).

In one embodiment, UE 102 has some requirements that can be separated into radio requirements associated with the cellular connectivity and GPU requirements for, for example, video rendering. Cellular resources and GPU resources may or may not be located at one specific base station. For example, both a first eNB and a second eNB may provide sufficient cellular connectivity (in terms of uplink or downlink throughput, latency, etc.), but that, for example, only the second eNB may provide enough GPU processing capabilities. Given this scenario, UE 102 may benefit from having means to initiate a handover from one eNB, which is able to provide good radio connectivity but poor (or even no) associated GPU processing, to another eNB that has sufficiently good radio conditions and also the required GPU rendering capabilities. Accordingly, handover management may be motivated not only from a cellular connectivity aspect, but also from a GPU performance aspect.

One approach to facilitate PU (e.g., GPU) based device mobility is to extend the UE reporting mechanism used for handover purposes to consider also PU rendering information so that handover between cells (e.g., between base stations) can be invoked both with respect to ordinary radio resource handling and the UE's PU requirements.

Accordingly, in some embodiments, the existing Radio Resource Control (RRC) Measurement Report framework is extended to consider, for example, GPU-rendering metric entities such as frame rate, rendering delay (total, within N node steps, etc.), rendering processing memory (total, consecutive, etc.), etc. For example, in some embodiments, the existing RRCMeasurement Report Event Ai, Bi, etc. may be complemented with a set of PU-related events (denoted "Pi", where i=1, 2, . . . ) so that a PU key performance indicator (KPI) condition may trigger UE 102 to transmit to its serving base station an RRC Measurement Report indicating that UE 102 has detected event Pi (e.g., UE 102 has detected a PU-related condition that should be addressed). In other embodiments, a new message is defined (e.g., a PUQualityMeasurementReport Event Pi) so that when UE 102 detects fulfilment of certain metric-constraints may trigger transmission of said report to its currently serving base station, where the events may, for example, relate to aspects of rendering frame rate, aspects of rendering delay, aspects of PU rendering node processing memory, etc. The Pi events may, for example, relate to:

P1: Aspects of rendering frame rate
P2: Aspects of transmission delay to rendering node
P3: Aspects of PU rendering node processing memory
P4: Aspects of PU platform characteristics (driver version, Nvidia/AMD platform) etc.

Furthermore, based on reception and interpretation of any PU-related event from the UE, either through an Event Pi in scope of an RRC Measurement Report Event or via some new defined PUQualityMeasurementReport Event Pi, the UE's serving base station may decide to initiate a UE handover in the cellular domain so that the device is to be managed by a base station that has sufficient PU resources available (or associated). In further aspects, a device-measure that triggers an Event Pi report may be e.g. related to e.g. current PU-provided rendering frame rate, rendering delay, for example:

P2a—PU measure X at source base station>threshold (+offset)
P2b—PU measure X at source base station<threshold (+offset)
P2c—PU measure X at source base station>threshold, and been so during TimerPU.

Upon reception of said Event Pi provided from the UE, the UE's serving (source) base station may start preparing for a cellular handover of the UE to a target (from radio perspective accessible) base station.

For instance, based on reception and interpretation of any PU-related event from the UE, exemplified as above, the base station may evaluate if the intended target cell as being indicated in any of the received reports are valid for a PU-related mobility event, and act accordingly. One of first steps of said evaluation includes the base station determining whether the intended target cell (e.g., the cell for which the UE reports a beneficial KPI) is valid for intended handover action; this information is may be obtained from the NCRT.

In one embodiment, a GPU frames-per-second (FPS) metric has either been benchmarked on the node itself or taken from a publicly available database. For gaming, this should be a score that is calculated on several scenes, preferably from very different games or benchmark suites. In one embodiment this FPS-metric could be binned for different resolutions ({UHD: 14 fps, 1080p: 38 fps, 720p: 70 fps} etc). For 90+ fps, this can also be CPU bound so the precision of the performance estimate for the whole rendering setup can be enhanced if the benchmark is run on the exact hardware. The benchmark number can both be based on average fps on these scenes or (probably better), the lowest 5% percentile. This way it describes the capabilities you can count on in 95% of the cases.

In one embodiment, assuming the serving base station decides to prepare for a handover of the UE to the target cell, the serving base station provides to the target base station information related to the UE's "cellular connectivity" resource requirements and PU resource requirements. In one embodiment, the serving base station provides this information to the target base station in an X2AP message (e.g., X2AP Resource Status Request message). Upon receiving the information from the serving base station, the target base station will decide whether it is able to satisfy the UE's requirements (cellular and PU) and transmit to the serving base station either a positive acknowledgement (ACK) indicating that the target base station and meet the requirement or a negative acknowledgement (NACK) indicating the opposite. For instance, the target base station responds to the X2AP Resource Status Request message by transmitting to the serving base station an X2AP Resource Status Response message that includes the ACK/NACK. After receiving the response from the target base station, the source base station decides whether to continue the handover procedure.

In another embodiment, the serving base station locally stores information on neighboring base stations available (local or associated) PU resources. Accordingly, in this embodiment the serving base station need not send to the target base station the status request message, but rather the serving base station decides whether to continue the handover procedure based on the information that it has locally stored. That is, based on the information that the serving base station has about the target base stations available PU resources, the serving base station evaluates if the UE's ongoing PU resource requirements may be fulfilled by PU resources available to the target base station.

In one embodiment, after deciding to continue the handover procedure, the serving base station transmits a handover request to the target base station, and, assuming the target responds with an ACK, the serving base station instructs the UE to commence with change of its serving base station to the target. In some embodiments, the serving base station so instructs the UE by transmitting to the UE an RRC Connection Reconfiguration Request. In some embodiments, after initiating the handover, the serving base station provides to the target base station: PU-related buffer content for the target base station to consider for starting PU rendering and information of what future position (frame) in data the data flow to the device should be swapped.

In another embodiment, rather than having the serving base station decide whether to perform the handover after receiving a report from the UE, the serving base station may obtain PU resource information for the target base station from either a locally stored database (e.g., an NCRT) or from the target base station itself (e.g., over the X2 interface), and provide to the UE the obtained PU resource information using, for example, dedicated (RRC) signaling. This "other than serving base station PU information" in combination with already existing radio measurement information (e.g., Reference Signal Received Power (RSPR) and/or Reference Signal Received Quality (RSRQ) as is used for legacy mobility evaluations) may be used by the UE to conduct a more detailed and joint "signal strength and PU-resource availability" evaluation, and based on that, trigger a joint "RRM+PU"-MeasurementReport Event that may be subject to a tradeoff between quality of the cellular connectivity available with source/target base station and whatever PU resource respective source/target base station may provide. That is, the UE itself decides whether to initiate a handover from the serving to the target based not only on the radio signal conditions at the serving and target base stations, but also based on the PU conditions at the serving and target base stations. Accordingly, the UE may consider if it is worth moving from serving to target given an achievable improvement of a PU-related metric of x % (e.g. reduced latency, higher resolution, higher frame rate, etc.) in comparison to a potential reduction of y dB RSRP/RSRQ where the latter would impairing the cellular connectivity. For instance, if x % is greater than a first threshold and y dB is less than a second threshold, then UE will decide to initiate the handover from the serving to the target.

NCRT with PU Extensions

In one embodiment, the NCRT is extended with respect to PU processing availability. For example, a GPU-extended NCRT may hold entries that block and/or admit handover to a target cell with respect to the cell (directly or in association) having any (or deemed sufficient) GPU processing capabilities. In one approach, a source base station is provided with a means to manage handover execution to a target base station depending on GPU metrics; either a complete handover may be admitted given that both cellular and GPU resource handling at target base station are determined "OK," or that any partial handover (e.g., cellular metric not OK, but GPU metric OK) may be evaluated but non-continued with given that the cellular demand is found not OK. Or the other way around (e.g., cellular metric OK, but GPU metric not OK).

With a basic approach that the NCRT describes "any availability" of PU processing capabilities at the target base station, a corresponding PU NRT entry may comprise a PU-resource availability column, where "yes" or similar is associated with any PU processing capabilities, and "no" otherwise. See e.g. Table 1 below.

TABLE 1

| Extended Neighbor Relation Table including PU availability entries | | | | | |
|---|---|---|---|---|---|
| Neighbor | | O&M controlled NR Attributes | | | |
| Relation | | No | No | No | PU resources |
| NR | TCI | remove | HO | X2 | available |
| 1 | TCI#1 | | | | ✓ |
| 2 | TCI#1 | ✓ | | ✓ | ✓ |
| 3 | TCI#1 | ✓ | | | ✓ |
| 4 | . . . | | | | |

The above illustrated table is "target-cell centric" where Target Cell Identifier (TCI) identifies the target cell and NR (Neighbor Relations) as any originating source cell that UE may arrive from. The "No remove" column, if checked, indicates that the base station shall not remove the Neighbour Cell Relation from the NCRT. The "No HO" column, if checked, indicates that the Neighbour Cell Relation shall not be used by the base station for handover reasons. The "No X2" column, if checked, indicates that the Neighbour Relation shall not use an X2 interface in order to initiate procedures towards the base station serving the target cell.

With additional granularity, an extended NCRT may also comprise entries further describing PU frame rate, data transfer delays, or similar. In Table 2, such an extended NCRT is illustrated.

TABLE 2

| Extended Neighbor Relation Table including more detailed GPU requirement entries | | | | | | | |
|---|---|---|---|---|---|---|---|
| Neighbor | | O&M controlled NR Attributes | | | O&M controlled PU Attributes | | |
| Relation | | No | No | No | PU | Delay | FPS |
| NR | TCI | remove | HO | X2 | available | metric | metric |
| 1 | TCI#1 | | | | ✓ | D1 | F1 |
| 2 | TCI#1 | ✓ | | ✓ | ✓ | D2 | F3 |
| 3 | TCI#1 | ✓ | | | | N/A | N/A |
| 4 | . . . | | | | | | |

As illustrated above, each entry in an extended NCRT may contain the following data fields: PU available, Delay metric, and FPS metric, in addition to the conventional fields of No remove, No HO, and No X2.

The PU available field may contain a Boolean value indicating whether or not PU processing capabilities are available at the base station or within some predefined reach (e.g., a predefined number of steps) of the base station.

In one embodiment, the Delay metric field contains a delay metric that is a threshold value that processing resource could respond with (provide) at x % probability. In the Delay metric field the delay metrics (Di) may be considered reflecting perceived delay from the processing node. In some embodiments, the value of the Delay metric may be set under the assumption that a typical value (e.g., X ms) to render a default resolution. Depending on implementation, the value of the Delay metric may or may not reflect a total delay: TotalDelay=RenderingDelay+GPU-to-eNB-transfer-Delay+RadioLinkDelay, or selected parts (or combinations) thereof.

The FPS metric field contains a measure on frame rendering capability. For example, the value of the FPS metric may specify that the available PU could respond with (provide) at y % probability. Depending on the implementation, the FPS metric may or may not assume a default fidelity value (e.g., anti-aliasing=off and/or shadow quality=high) in the estimate (e.g., assuming x FPS in a default resolution). With the information provided to the base station via any of the previously discussed UE reporting messages (e.g. RRC Measurement Report Event Ai/Bi complemented with a set of GPU-related trigger events Gi or some GPUQualityMeasurementReport, carrying relevant GPU processing measures), the base station may determine the device's frame rendering requirement.

Table 3 below illustrates yet another possible embodiment of an NCRT table, which may be used by a source base station to determine whether or not a given detected base station should be selected for a handover. In this embodiment it is recognized that requested PU processing capabilities are not located on the same node as the base station, but still associated and potentially accessible to the base station within a number of steps (i.e., 'GPU node steps') in the network.

TABLE 3

Extended Neighbor Relation Table including
GPU requirements and "reach"

| Neighbor | O&M controlled | | | | O&M controlled PU Attributes | | |
| | NR Attributes | | | PU | | | |
| Relation | No remove | No HO | No X2 | avail-able | PU node steps | Delay metric | FPS metric |
| NR | TCI | | | | | | | |
| 1 | TCI#1 | | | | ✓ | 0 | D1 | F1 |
| 2 | TCI#1 | ✓ | | ✓ | ✓ | 2 | D2 | F1 |
| 3 | TCI#1 | ✓ | | | N/A | N/A | N/A | N/A |
| 4 | . . . | | | | | | | |

In some embodiments, the Delay metric can be set based on the PU node steps value as it is plausible that processing resources further steps away from the base station node may be associated with a delay figure representative for the characteristics for said communications links. That is, there may be a direct correlation between the PU nodes steps value and a delay value, which delay value can be added to the Delay metric.

Table 4 below illustrates yet another possible embodiment. In this embodiment, aggregated high-level table entries are defined. More specifically, as illustrated in Table 4, two classes of PU requirements are defined: "Low" and "High." Each such requirement has the following corresponding fields: No remove, No HO and No X2. Accordingly, each entry (row) of the table includes the following fields: NR; TCI; No remove, No HO, and No X2 for PU requirement Low; and No remove, No HO, and No X2 for PU requirement High. Accordingly, when the base station obtains information about the UE's GPU-related metric via e.g., relevant RRC and/or GPU metric signaling, the base station may classify the UE has requiring "High" or "Low" PU resources. That is, based on, for example, a delay value and a FPS value, the base station can map this value pair to either category High or category Low. And then, depending on the mapping, use the appropriate fields from the extended NCRT.

Accordingly, for example, in a scenario where a UE to be considered for handover management is associated with a demanding GPU service that is determined as having "high" GPU requirements, the serving base station may consider to follow cell relation rules as outlined in the extended neighbor relation table for the entry GPU requirement "High." Similarly, a UE in the context of a handover event that is reporting GPU attributes associated with a less demanding GPU rendering may be associated with the GPU requirement "Low" and potentially comply with other cell relation rules. Depending on design of GPU-related reporting primitives (e.g. as RRCMeasurement Report Event Ai;Bi e.g. complemented with a set of GPU-related events Gi, etc., or similarly GPUQualityMeasurementReport Event Gi, . . . , or similar) a UE GPU-related measurement report may, according to Table 4, aggregate GPU requirements and provide the serving base station with an aggregated GPU measure according to "high", "low", etc.

TABLE 4

Extended Neighbor Relation Table
including GPU requirement entries

| Neighbor Relation | | PU requirement: "Low" | | | PU requirement: "High" | | |
| | | No remove | No HO | No X2 | No remove | No HO | No X2 |
| NR | TCI | | | | | | |
| 1 | TCI#1 | | | | | ✓ | |
| 2 | TCI#1 | ✓ | | ✓ | ✓ | | ✓ |
| 3 | TCI#1 | ✓ | | | ✓ | | |

As a specific example, consider a UE that has an ongoing PU rendering task in a source cell (say "NR=1"), where the task is classified as requiring "Low" PU resources, and that is considered for handover to target cell 1 (e.g., TCI #1). In this scenario, because the No HO field corresponding to the "Low" PU requirement is not checked, a handover to the target cell is potentially feasible. But now consider that the UE has an ongoing PU rendering task in a source cell (say "NR=1"), where the task is classified as requiring "High" PU resources, and that the UE is considered for handover to target cell 1 (e.g., TCI #1). In this scenario, because the No HO field corresponding to the "High" PU requirement is checked, a handover to the target cell is not allowed (perhaps due to insufficient PU rendering capabilities in respect to a "high" requirements). Instead, another target cell may be considered as valid for said handover of the UE.

Additional PU Attributes Resources to be Added to NRT

In some embodiments, additional or alternative PU attributes may be added to the NCRT, such as, for example, RAM availability, inferencing machine learning (ML) model availability, green processing capabilities, etc. Additionally, FPS is typically dependent on resolution and scene complexity, and, therefore, floating operations per second (Flops) could be used instead with separate numbers per bit depth (Single precision, double etc.). When taking machine learning into account, platform support can be important. Docker, Tensorflow, torch, python version capabilities, etc. should be handshaked between model server and edge rendering device, screening some edge rendering devices for the ongoing session, both for inferencing and model training. There might also be specific "ML cores" that can speedup inference immensely, but that should fit in the description already included with hardware platform and driver version.

FIG. 3 is a flowchart illustrating a process 300, according to an embodiment, for managing handover execution. Process 300 may be performed by base station 104 and may begin in step s302. Step s302 comprises storing first neighbor cell relation (NCR) information for a first target cell, wherein the first NCR information comprises: i) a first cell identifier for identifying the first target cell and ii) processing unit (PU) information indicating whether or not the target cell has at least one PU available. Step s304 comprises evaluating whether or not to initiate a handover of a UE (e.g., UE 102) from the source cell to the target cell, wherein the evaluation is based at least in part on the PU information for the target cell.

In some embodiments the PU information comprises PU performance information for at least a first PU, and, in some embodiments, the PU performance information for the first PU comprises video frame rendering capability information and/or a delay metric. In some embodiments the video frame rendering capability information comprises a time value indicating an estimated amount of time that it will take the first PU to produce a result (e.g., rendering a video frame or producing an inference). Accordingly, in some embodiments the time value indicates an estimated amount of time to render a video frame having a particular resolution and/or a particular set of fidelity settings, or the time value indicates an estimated amount of time to produce an inference. In some embodiments the PU performance information further comprises information specifying distance (e.g., a number of steps or hops) between an available PU and the base station. Examples of fidelity settings include: an anti-aliasing setting (e.g. off, on, fast approximate anti-aliasing (FXAA), . . . ); a shadow quality setting (e.g., low, medium, or high); a texture quality setting (e.g., low, medium, high); a tessellation setting (e.g., on or off); a deep learning super sampling (DLSS) setting (e.g., on or off); and a ray tracing setting (e.g., on or off).

In some embodiments, process 300 further includes obtaining for the UE a threshold time value indicating a threshold amount of time, wherein the evaluation as to whether or not to initiate the handover of the UE from the source cell to the target cell is further based on the PU performance information and the threshold time value. In some embodiments the threshold time value is based on a video frame rate. In some embodiments the threshold is equal to the reciprocal of the video frame rate.

In some embodiments process 300 also includes receiving an event report message transmitted by the UE, wherein the step of evaluating whether or not to initiate the handover of the UE from the source cell to the target cell is performed as a result of receiving the event report message. In some embodiments the event report message includes the threshold time value. In some embodiments the event report message further includes reference signal measurement information for the target cell. In some embodiments the event report message is a PU quality measurement report, wherein the PU quality measurement report indicates that the UE has detected a PU related event. In some embodiments the PU quality measurement report comprises information indicating that a key performance indicator, KPI, for a PU currently serving the UE has met a criterion (e.g., the KPI exceeds a threshold or has fallen below a threshold). In some embodiments receiving the PU quality measurement report comprises receiving a Radio Resource Control (RRC) Measurement Report message comprising the PU quality measurement report.

Figure 4:
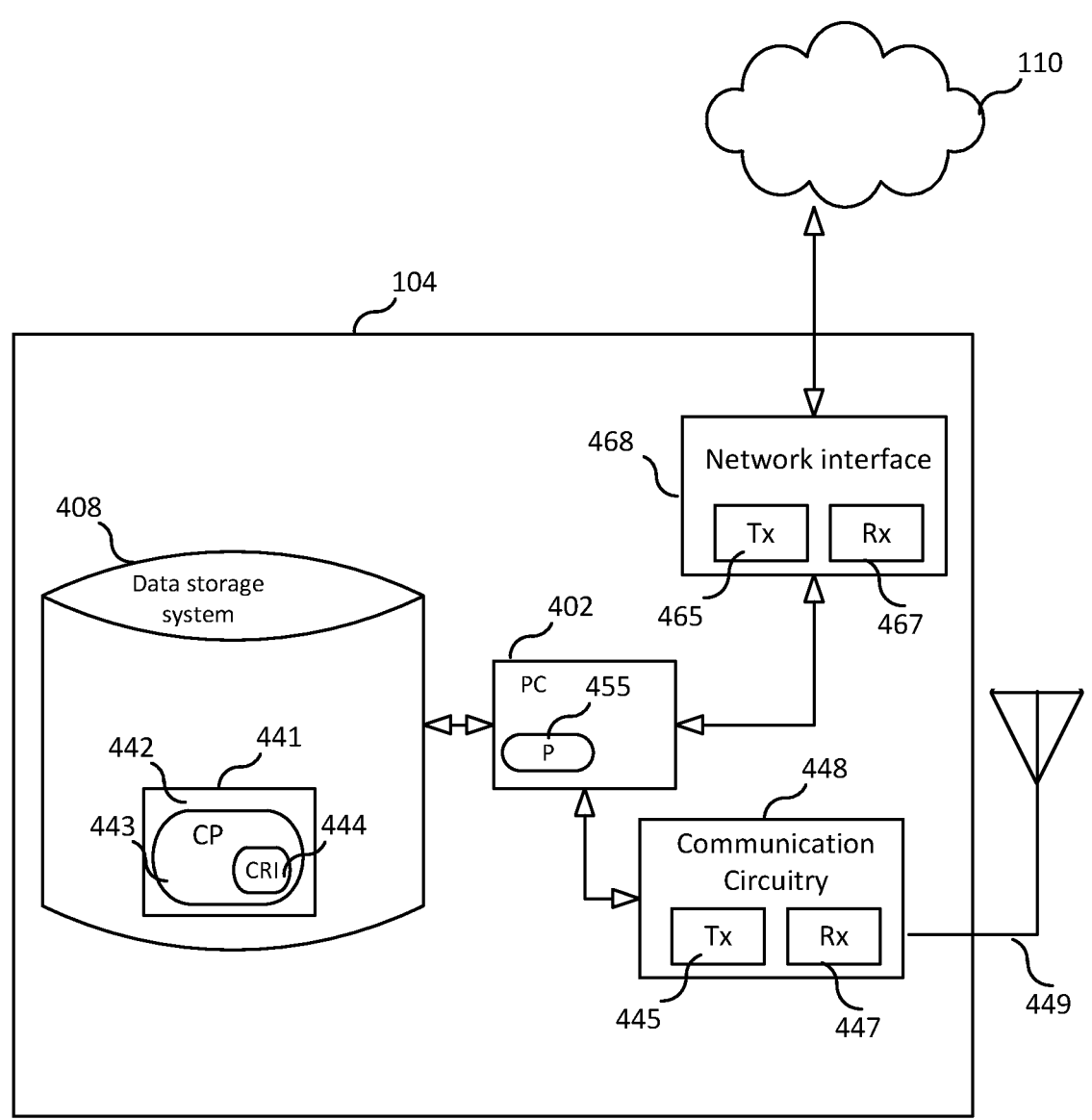
FIG. 4 is a block diagram of a base station according to an embodiment.

FIG. 4 is a block diagram of base station 104, according to some embodiments. As shown in FIG. 4, base station 104 may comprise: processing circuitry (PC) 402, which may include one or more processors (P) 455 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., base station 104 may be a distributed computing apparatus); a network interface 468 comprising a transmitter (Tx) 465 and a receiver (Rx) 467 for enabling base station 104 to transmit data to and receive data from other nodes connected to a network 40 (e.g., an Internet Protocol (IP) network) to which network interface 468 is connected; communication circuitry 448, which is coupled to an antenna arrangement 449 comprising one or more antennas and which comprises a transmitter (Tx) 445 and a receiver (Rx) 447 for enabling base station 104 to transmit data and receive data (e.g., wirelessly transmit/receive data); and a local storage unit (a.k.a., "data storage system") 408, which may include one or more non-volatile storage devices and/or one or more volatile storage devices. In embodiments where PC 402 includes a programmable processor, a computer program product (CPP) 441 may be provided. CPP 441 may be or includes a computer readable storage medium (CRSM) 442 storing a computer program (CP) 443 comprising computer readable instructions (CRI) 444. CRSM 442 may be a non-transitory computer readable storage medium, such as, magnetic media (e.g., a hard disk), optical media, memory devices (e.g., random access memory, flash memory), and the like. In some embodiments, the CRI 444 of computer program 443 is configured such that when executed by PC 402, the CRI causes base station 104 to perform steps described herein (e.g., steps described herein with reference to the flow charts). In other embodiments, base station 104 may be configured to perform steps described herein without the need for code. That is, for example, PC 402 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, performed by a base station serving a source cell, for managing handover execution, the method comprising:

storing first neighbor cell relation (NCR) information for a first target cell, wherein the first NCR information comprises: i) a first cell identifier for identifying the first target cell and ii) processing unit (PU) information indicating whether or not the target cell has at least one PU available; and evaluating whether or not to initiate a handover of a user equipment (UE) from the source cell to the target cell, wherein the evaluation is based at least in part on the PU information for the target cell, wherein
the target cell comprises a first PU,
the PU information comprises first PU performance information indicating a performance of a first PU,
the first PU performance information for the first PU comprises video frame rendering capability information for the first PU, and
the video frame rendering capability information comprises a time value indicating an estimated amount of time that it will take the first PU to produce a result.

2. The method of claim 1, wherein
the time value indicates an estimated amount of time to render a video frame having a particular resolution and/or a particular set of one or more fidelity settings, or
the time value indicates an estimated amount of time to produce an inference.

3. The method of claim 1, wherein
the method further comprises obtaining for the UE, a threshold time value indicating a threshold amount of time, and
the evaluation as to whether or not to initiate the handover of the UE from the source cell to the target cell is further based on the PU performance information and threshold time value.

4. A non-transitory computer readable storage medium storing a computer program comprising instructions for configuring a base station serving a source cell to perform a method comprising:
storing first neighbor cell relation (NCR) information for a first target cell, wherein the first NCR information comprises: i) a first cell identifier for identifying the first target cell and ii) processing unit (PU) information indicating whether or not the target cell has at least one PU available; and
evaluating whether or not to initiate a handover of a user equipment (UE) from the source cell to the target cell, wherein the evaluation is based at least in part on the PU information for the target cell, wherein
the target cell comprises a first PU,
the PU information comprises first PU performance information indicating a performance of a first PU,
the first PU performance information for the first PU comprises video frame rendering capability information for the first PU, and
the video frame rendering capability information comprises a time value indicating an estimated amount of time that it will take the first PU to produce a result.

5. A base station, the base station comprising:
a storage device for storing first neighbor cell relation (NCR) information for a first target cell, wherein the first NCR information comprises: i) a first cell identifier for identifying the first target cell and ii) processing unit (PU) information indicating whether or not the target cell has at least one PU available; and
processing circuitry for evaluating whether or not to initiate a handover of a user equipment (UE) from the source cell to the target cell, wherein the evaluation is based at least in part on the PU information for the target cell, wherein
the target cell comprises a first PU, the PU information comprises first PU performance information indicating a performance of a first PU,
the first PU performance information for the first PU comprises video frame rendering capability information for the first PU, and
the video frame rendering capability information comprises a time value indicating an estimated amount of time that it will take the first PU to produce a result.

6. The base station of claim 5, wherein
the time value indicates an estimated amount of time to render a video frame having a particular resolution and/or a particular fidelity, or
the time value indicates an estimated amount of time to produce an inference.

7. The base station of claim 5, further being configured to:
obtain for the UE a threshold time value indicating a threshold amount of time, wherein
the evaluation as to whether or not to initiate the handover of the UE from the source cell to the target cell is further based on the PU performance information and threshold time value.

8. The base station of claim 7, wherein
the threshold time value is based on a video frame rate.

9. The base station of claim 8, wherein
the threshold is equal to the reciprocal of the video frame rate.

10. The base station of claim 7, wherein
the base station is further configured to receive an event report message transmitted by the UE, and
the base station is further configured to evaluate whether or not to initiate the handover of the UE from the source cell to the target cell as a result of receiving the event report message.

11. The base station of claim 10, wherein
the event report message includes the threshold time value.

12. The base station of claim 10, wherein
the event report message further includes reference signal measurement information for the target cell.

13. The base station of claim 10, wherein
the event report message is a PU quality measurement report, wherein the PU quality measurement report indicates that the UE has detected a PU related event.

14. The base station of claim 13, wherein
the PU quality measurement report comprises information indicating that a key performance indicator (KPI) for a PU currently serving the UE has met a criterion.

15. The base station of claim 13, wherein
receiving the PU quality measurement report comprises receiving a Radio Resource Control (RRC) Measurement Report message comprising the PU quality measurement report.

16. The base station of claim 5, wherein
the PU performance information further comprises information specifying distance between an available PU and the base station.

17. The base station of claim 16, wherein
the information specifying distance between the available PU and the base station is a value indicating a number of hops between the available PU and the base station.

* * * * *